(12) United States Patent
Gupta

(10) Patent No.: US 8,843,704 B2
(45) Date of Patent: *Sep. 23, 2014

(54) STRIDE BASED FREE SPACE MANAGEMENT ON COMPRESSED VOLUMES

(71) Applicant: International Business Machines Corporation, Armonk, NY (US)

(72) Inventor: Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,486

(22) Filed: Mar. 8, 2013

(65) Prior Publication Data

US 2013/0205084 A1 Aug. 8, 2013

Related U.S. Application Data

(63) Continuation of application No. 13/087,226, filed on Apr. 14, 2011.

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0689* (2013.01); *G06F 3/0608* (2013.01); *G06F 3/0613* (2013.01); *G06F 3/064* (2013.01); *G06F 2212/401* (2013.01)
USPC ........................................................ 711/114

(58) Field of Classification Search
CPC ..... G06F 3/0608; G06F 3/0613; G06F 3/0689; G06F 2211/1066; G06F 2212/401
USPC ........................................................ 711/114
See application file for complete search history.

(56) References Cited

U.S. PATENT DOCUMENTS

| 5,734,892 | A | 3/1998 | Chu |
| 6,028,725 | A | 2/2000 | Blumenau |
| 6,260,115 | B1 | 7/2001 | Permut et al. |
| 6,532,121 | B1 | 3/2003 | Rust et al. |
| 6,532,517 | B1 | 3/2003 | Wagner et al. |
| 7,062,604 | B1 | 6/2006 | Nanda |

(Continued)

OTHER PUBLICATIONS

Lee et al. "Performance Analysis of a Selectively Compressed Memory System", Microprocessors and Microsystems, 2002, 14 pgs.

(Continued)

*Primary Examiner* — Matthew Bradley
*Assistant Examiner* — Rocio Del Mar Perez-Velez
(74) *Attorney, Agent, or Firm* — Rabindranath Dutta; Konrad, Raynes, Davda and Victor LLP

(57) ABSTRACT

Compressed data is maintained in a plurality of strides of a redundant array of independent disks, wherein a stride is configurable to store a plurality of tracks. A request is received to write one or more tracks, and a determination is made as to whether all of the one or more tracks can be stored in one selected stride of the plurality of strides. In response to determining that all of the one or more tracks can be stored in the one selected stride, the one or more tracks are written in the one selected stride of the plurality of strides.

9 Claims, 7 Drawing Sheets

(56) References Cited

U.S. PATENT DOCUMENTS

| | | | |
|---|---|---|---|
| 7,447,836 | B2 | 11/2008 | Zhang et al. |
| 7,512,862 | B1 | 3/2009 | Taylor |
| 7,577,787 | B1 | 8/2009 | Yochai et al. |
| 2004/0093463 | A1 | 5/2004 | Shang |
| 2005/0228963 | A1 | 10/2005 | Rothman et al. |
| 2005/0257083 | A1* | 11/2005 | Cousins .......................... 714/6 |
| 2008/0077762 | A1 | 3/2008 | Scott et al. |
| 2009/0049238 | A1 | 2/2009 | Zhang et al. |
| 2010/0017578 | A1 | 1/2010 | Mansson et al. |
| 2010/0250864 | A1 | 9/2010 | Carty |
| 2010/0298999 | A1* | 11/2010 | Allgaier et al. ............... 700/296 |
| 2011/0107052 | A1* | 5/2011 | Narayanasamy ............. 711/171 |
| 2011/0196987 | A1 | 8/2011 | Benhase et al. |

OTHER PUBLICATIONS

U.S. Appl. No. 13/087,226, filed Apr. 14, 2011, entitled "Stride Based Free Space Management on Compressed Volumes", by Lokesh M Gupta et al. pp. 1-27.

U.S. Appl. No. 13/087,236, filed Apr. 14, 2011, entitled "Writing Adjacent Tracks to a Stride, Based on a Comparison of a Destaging of Tracks to a Defragmentation of the Stride", invented by Lokesh M. Gupta et al, pp. 1-27.

U.S. Appl. No. 13/787,696, filed Mar. 6, 2013, entitled "Writing Adjacent Tracks to a Stride, Based on a Comparison of a Destaging of Tracks to a Defragmentation of the Stride", by Lokesh M. Gupta et al., pp. 1-26.

Preliminary Amendment, dated May 13, 2011, for U.S. Appl. No. 13/087,226, filed Apr. 14, 2011, pp. 1-10.

Preliminary Amendment, dated Apr. 14, 2011, for U.S. Appl. No. 13/087,236, filed Apr. 14, 2011, pp. 1-3.

Preliminary Amendment, dated May 13, 2011, for U.S. Appl. No. 13/087,236, filed Apr. 14, 2011, pp. 1-9.

Preliminary Amendment, dated Mar. 6, 2013, for U.S. Appl. No. 13/087,236, filed Apr. 14, 2011, pp. 1-6.

Preliminary Remarks, dated Mar. 6, 2013, for U.S. Appl. No. 13/787,696, filed Mar. 6, 2013, pp. 1-2.

Office Action, dated Jun. 7, 2013, for U.S. Appl. No. 13/087,226 (37.260), filed Apr. 14, 2011, entitled "Stride Based Free Space Management on Compressed Volumes", invented by lokesh M. Gupta, pp. 1-22.

Office Action, dated Aug. 19, 2013, for U.S. Appl. No. 13/787,696 (37.263C1), filed Mar. 6, 2013, entitled "Writing Adjacent Tracks to a Stride, Based on a Comparison of a Destaging of Tracks to a Defragmentation of the Stride", invented by Lokesh M. Gupta et al., pp. 1-24.

Office Action, dated Jun. 7, 2013, for U.S. Appl. No. 13/087,226 (37.260), filed Apr. 14, 2011, entitled "Stride Based Free Space Management on Compressed Volumes", invented by Lokesh M. Gupta et al., pp. 1-22.

Response to Office Action, dated Sep. 9, 2013, for U.S. Appl. No. 13/087,226 (37.260), filed Apr. 14, 2011, entitled "Stride Based Free Space Management on Compressed Volumes", invented by Lokesh M. Gupta et al., pp. 1-12.

Final Office Action, dated Sep. 30, 2013, for U.S. Appl. No. 13/087,226 (37.260), filed Apr. 14, 2011, entitled "Stride Based Free Space Management on Compressed Volumes", invented by Lokesh M. Gupta et al., pp. 1-22.

Office Action, dated Aug. 8, 2013, for U.S. Appl. No. 13/087,236 (37.263), filed Apr. 14, 2011, entitled "Writing Adjacent Tracks to a Stride, Based on a Comparison of a Destaging of Tracks to a Defragmentation of the Stride", invented by Lokesh M. Gupta et al., pp. 1-42.

Response to Office Action, dated Dec. 9, 2013, for U.S. Appl. No. 13/087,236 (37.263), filed Apr. 14, 2011, entitled "Writing Adjacent Tracks to a Stride, Based on a Comparison of a Destaging of Tracks to a Defragmentation of the Stride", invented by Lokesh M. Gupta et al., pp. 1-9.

Response to Office Action, dated Nov. 19, 2013, for U.S. Appl. No. 13/787,696 (37.263C1), filed Mar. 6, 2013, entitled "Writing Adjacent Tracks to a Stride, Based on a Comparison of a Destaging of Tracks to a Defragmentation of the Stride", invented by Lokesh M. Gupta et al., pp. 1-4.

Office Action, dated Dec. 6, 2013, or U.S. Appl. No. 13/787,696 (37.263C1), filed Mar. 6, 2013, entitled "Writing Adjacent Tracks to a Stride, Based on a Comparison of a Destaging of Tracks to a Defragmentation of the Stride", invented by Lokesh M. Gupta et al., pp. 1-22.

Response to Office Action, dated Sep. 9, 2013 for U.S. Appl. No. 13/087,226 (37.260), filed Apr. 14, 2011, entitled, "Stride Based Free Space Managaement on Compressed Volumes", invented by Lokesh M. Gupta et al., pp. 1-12.

Final Office Action, dated Sep. 30, 2013 for U.S. Appl. No. 13/087,226 (37.260), filed Apr. 14, 2011, entitled, "Stride Based Free Space Management on Compressed Volumes", invented by Lokesh M. Gupta et al., pp. 1-12.

Response to Final Office Action, dated Sep. 30, 2013 for U.S. Appl. No. 13/087,226 (37.260), filed Apr. 14, 2011, entitled, "Stride Based Free Space Management on Compressed Volumes", invented by Lokesh M. Gupta et al., pp. 1-22.

Final Office Action, dated Jan. 17, 2014 for U.S. Appl. No. 13/087,226 (37.260), filed Apr. 14, 2011, entitled, "Stride Based Free Space Management on Compressed Volumes", invented by Lokesh M. Gupta et al., pp. 1-14.

Office Action, dated Aug. 8, 2013, for U.S. Appl. No. 13/087,236 (37.263) filed Apr. 14, 2011, entitled, "Writing Adjacent Tracks to a Stride, Based on a Comparison of a Destaging of Tracks to a Defragmentation of the Stride", invented by Lokesh M. Gupta et al., pp. 1-9.

Response to Office Action, dated Dec. 9, 2013 for U.S. Appl. No. 13/087,236 (37.263), filed Apr. 14, 2011, entitled, "Writing Adjacent Tracks to a Stride, Based on a Comparison of a Destaging of Tracks to a Defragmentation of the Stride", invented by Lokesh M. Gupta et al., pp. 1-9.

Notice of Allowance, dated Jan. 6, 2014, for U.S. Appl. No. 13/087,236 (37.263), filed Apr. 14, 2011, entitled, "Writing Adjacent Tracks to a Stride, Based on a Comparison of a Destaging of Tracks to a Defragmentation of the Stride", invented by Lokesh M. Gupta et al., pp. 1-15.

Response to Office Action, dated Nov. 19, 2013, for U.S. Appl. No. 13/787,696 (37.263C1), filed Mar. 6, 2013, entitled, "Writing Adjacent Tracks to a Stride, Based on a Comparison of a Destaging of Tracks to a Defragmentation of the Stride", invented by Lokesh M. Gupta et al., pp. 1-4.

Office Action, dated Dec. 6, 2013, for U.S. Appl. No. 13/787,696 (37.263C1), filed Mar. 6, 2013, entitled, "Writing Adjacent Tracks to a Stride, Based on a Comparison of a Destaging of Tracks to a Defragmentation of the Stride", invented by Lokesh M. Gupta et al., pp. 1-22.

Response to Office Action, dated Mar. 6, 2014, for U.S. Appl. No. 13/787,696 (37.263C1), filed Mar. 6, 2013, entitled, "Writing Adjacent Tracks to a Stride, Based on a Comparison of a Destaging of Tracks to a Defragmentation of the Stride", invented by Lokesh M. Gupta et al., pp. 1-9.

Notice of Allowance, dated Apr. 1, 2014, for U.S. Appl. No. 13/787,696 (37.263C1), filed Mar. 6, 2013, entitled, "Writing Adjacent Tracks to a Stride, Based on a Comparison of a Destaging of Tracks to a Defragmentation of the Stride", invented by Lokesh M. Gupta et al., pp. 1-17.

Notice of Allowance, dated Apr. 11, 2014, for U.S. Appl. No. 13/087,236 (37.263), filed Apr. 14, 2011, entitled, "Writing Adjacent Tracks to a Stride, Based on a Comparison of a Destaging of Tracks to a Defragmentation of the Stride", invented by Lokesh M. Gupta et al., pp. 1-17.

Response to Final Office Action, dated Apr. 11, 2014, for U.S. Appl. No. 13/087,226 (37.260), filed Apr. 14, 2011, entitled, "Stride Based Free Space Management on Compressed Volumes", invented by Lokesh M. Gupta et al., Total 13 pages.

Notice of Allowance, dated May 14, 2014, for U.S. Appl. No. 13/087,226 (37.260), filed Apr. 14, 2011, entitled, "Stride Based Free Space Management on Compressed Volumes", invented by Lokesh M. Gupta et al., Total 16 pages.

\* cited by examiner

STRIDE BASED FREE SPACE MANAGEMENT ON COMPRESSED VOLUMES

CROSS-REFERENCE TO RELATED APPLICATIONS

This application is a continuation of application Ser. No. 13/087,226 filed on Apr. 14, 2011, which is incorporated herein by reference in its entirety.

BACKGROUND

1. Field

The disclosure relates to a method, system, and article of manufacture for stride based free space management on compressed volumes.

2. Background

A computing environment may include a storage controller that controls a plurality of storage devices. The plurality of storage devices controlled by the storage controller may include solid state disks, hard disks, tapes, etc.

A host computational device may send input/output (I/O) requests to the storage controller. The storage controller may satisfy the I/O requests by reading data from one or more storage devices, or by writing data to one or more storage devices. Once the I/O requests are satisfied the storage controller may send appropriate responses to the host computational device.

SUMMARY OF THE PREFERRED EMBODIMENTS

Provided are a method, a system, and a computer program product in which compressed data is maintained in a plurality of strides of a redundant array of independent disks (RAID), wherein a stride is configurable to store a plurality of tracks. A request is received to write one or more tracks, and a determination is made as to whether all of the one or more tracks can be stored in one selected stride of the plurality of strides. In response to determining that all of the one or more tracks can be stored in the one selected stride, the one or more tracks are written in the one selected stride of the plurality of strides.

In certain embodiments, the one or more tracks are written next to a sequentially adjacent track in the one selected stride, wherein any two sequentially adjacent tracks are indexed consecutively.

In farther embodiments, a reorganization of the plurality of strides is performed in an attempt to accommodate the one or more tracks in a single stride, in response to p determining that all of the one or more tracks cannot be stored in the one selected stride. The one or more tracks are written to the single stride, in response to the reorganization generating the single stride to accommodate the one or more tracks.

In yet further embodiments, the one or more tracks are distributed to more than one stride, in response to the reorganization not being able to generate the single stride to accommodate the one or more tracks.

In certain embodiments, the plurality of strides are distributed among a plurality of mini extents, wherein the plurality of mini extents are distributed among a plurality of extents. Metadata associated with the extents, mini extents, and strides store information on the number of completely empty strides, an amount of available space in each stride, and the maximum space available in any stride in any mini extent, wherein the one or more tracks are preferred to be stored in the same mini extent even if the one or more tracks cannot be stored in the same stride.

In additional embodiments, the redundant array of independent disks are configured to conform to a RAID-5 level in which data and parity striping is performed across all drives.

In yet additional embodiments, a deployment of computing infrastructure is performed. Computer-readable code is integrated into a computational system, wherein the computer-readable code in combination with the computational system performs the maintaining of the compressed data in the plurality of strides of the redundant array of independent disks, the receiving of the request to write the one or more tracks, the determining of whether all of the one or more tracks can be stored in one selected stride of the plurality of strides, and the writing of the one or more tracks in the one selected stride of the plurality of strides.

In further embodiments, the integrating of the computer-readable code into the computational system is performed by downloading the computer-readable code to the computational system in a networked computing environment.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Redundant Array of Independent Disks (RAID) is a category of disk drives that combine two or more disk drives to provide fault tolerance for data. RAID allows for the redundant storage of the same data across a plurality of disks. In certain configurations of RAID, parity information may also be stored to recover from a failure of one or more disks. The physical disks of a RAID may be said to be in a RAID array that may be addressed by an operating system as one single disk.

Data may be written in stripes in a RAID array, wherein data striping is the spreading out of blocks of each file across a plurality of disk drives. The spread out blocks may be written in various strides of the RAID array, wherein a stride is a unit of storage in the RAID array.

Data compression is the storing of data in a format that requires less storage space than the original data, wherein the original data is compressed to provide compressed data. A RAID array may be configured to store compressed data. Data may be written, overwritten, and deleted from a RAID array over a period of time. Garbage collection and defragmentation may have to be periodically performed on the RAID array for preventing deterioration in the performance of the RAID array over a period of time.

Certain embodiments allow one or more sequentially numbered tracks to be written on the same stride of a plurality of strides of a RAID array. For example, tracks that are numbered 353, 354, 355, 356 may all be written in a single stride of a plurality of strides of the RAID array. Furthermore, while writing tracks, a stride that already has tracks that are adjacent to the tracks to be written may be preferred over other strides. For example, if stride "Q" already has track 352 stored on the stride and has adequate space to accommodate the tracks 353, 354, 355, 356, then the tracks 353, 354, 355, 356 may be written adjacent to the existing track 352 in stride "Q". Performance is enhanced in a compressed RAID array by storing sequentially numbered tracks together on the same stride of a compressed RAID array, whenever such storing of sequentially numbered tracks is possible.

Details of Embodiments

Figure 1:
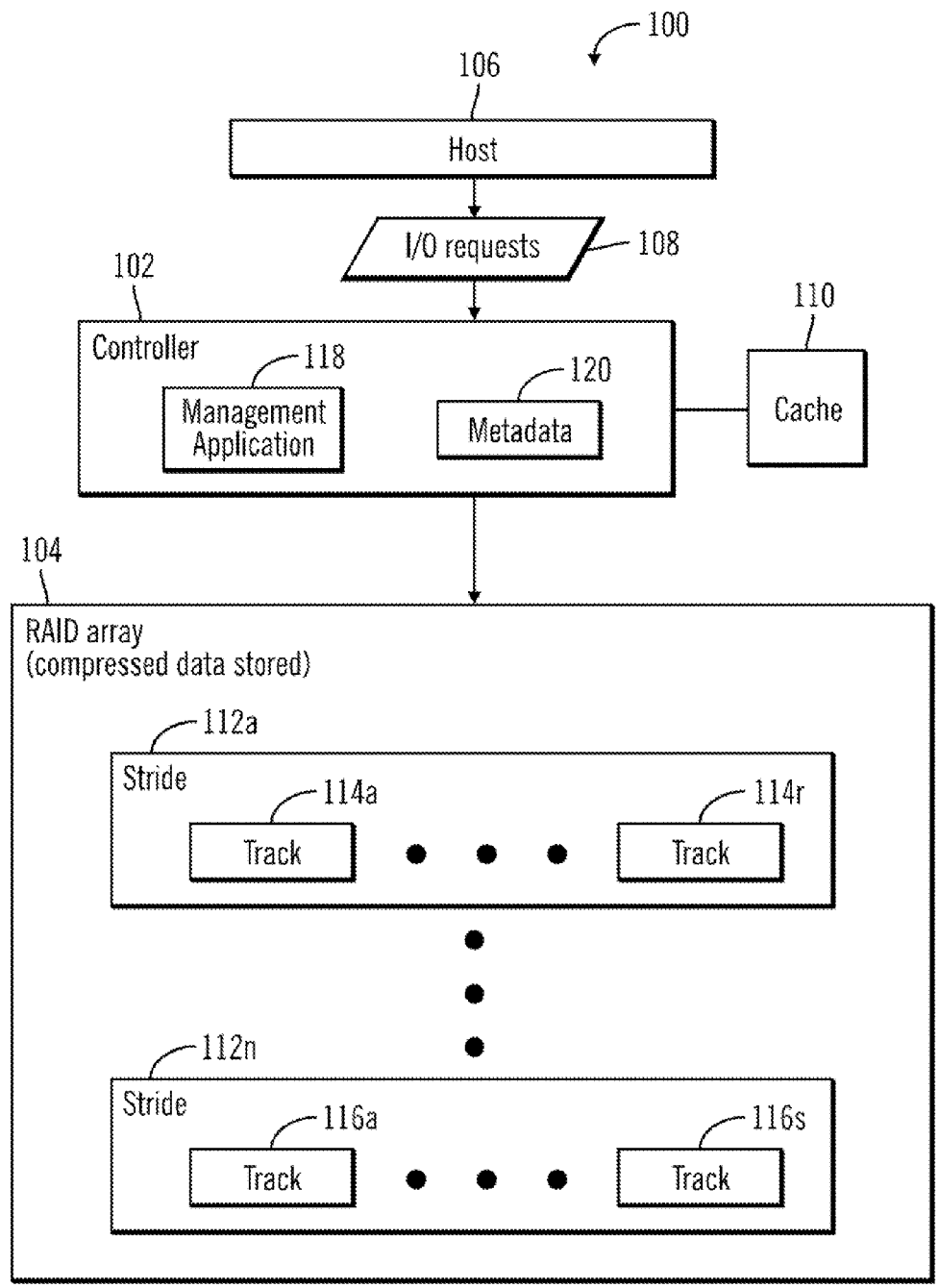
FIG. 1 illustrates a block diagram of a computing environment that includes a controller that controls a RAID array, in accordance with certain embodiments.

FIG. 1 illustrates a block diagram of a computing environment 100 that includes a controller 102 that controls a RAID array 104, in accordance with certain embodiments. A host 106 may generate input/output (I/O) requests 108 to the controller 102, causing the controller 102 to read or write tracks with respect to the RAID array 104 via a cache 110. The RAID array 104 may be configured to be of any type of RAID level. For example, in certain embodiments, the RAID array 104 is configured to conform to a RAID-5 level in which data and parity striping may be performed across all drives. In other embodiments, the RAID array 104 may be configured to be of some other type of RAID level such as RA1D-1, RAID-2, RAID-3, RA1D-4, RAID-6, etc.

The controller 102 and the host 106 may comprise any suitable computational device including those presently known in the art, such as, a personal computer, a workstation, a server, a mainframe, a hand held computer, a palm top computer, a telephony device, a network appliance, a blade computer, a server, etc. The RAID array 104 shown in FIG. 1 may be comprised of a plurality of disks. The controller 102, the host 106, and the RAID army 104 may be components in a distributed computing environment, such as a cloud computing environment or a networked computing environment.

In certain embodiments, the RAID array 104 may store a plurality of strides 112a . . . 112n. Each of the plurality of strides 112a . . . 112n may store a plurality of tracks. For example, stride 112a may store tracks 114a . . . 114r, and stride 112n may store tracks 116a . . . 116s. A track represents one of a series of thin concentric rings on a disk, which a read/write head accesses and along which data is stored in separate sectors. A stride is a unit is storage in a RAID array in which tracks may be stored. In certain embodiments, compressed data is stored in the strides 112a . . . 112n of the RAID array 104. In certain alternative embodiments, other units of storage besides strides may also be implemented in the RAID array 104.

In certain embodiments, the controller 102 has a management application 118 that executes within the controller 102.

The controller 102 also stores metadata 120 related to the strides 112a . . . 112n of the RAID array 104, wherein the metadata 120 comprises information related to the strides that may be processed by the management application 118 to determine which of plurality of strides 112a . . . 112n is to be selected for writing one or more tracks.

Figure 2:
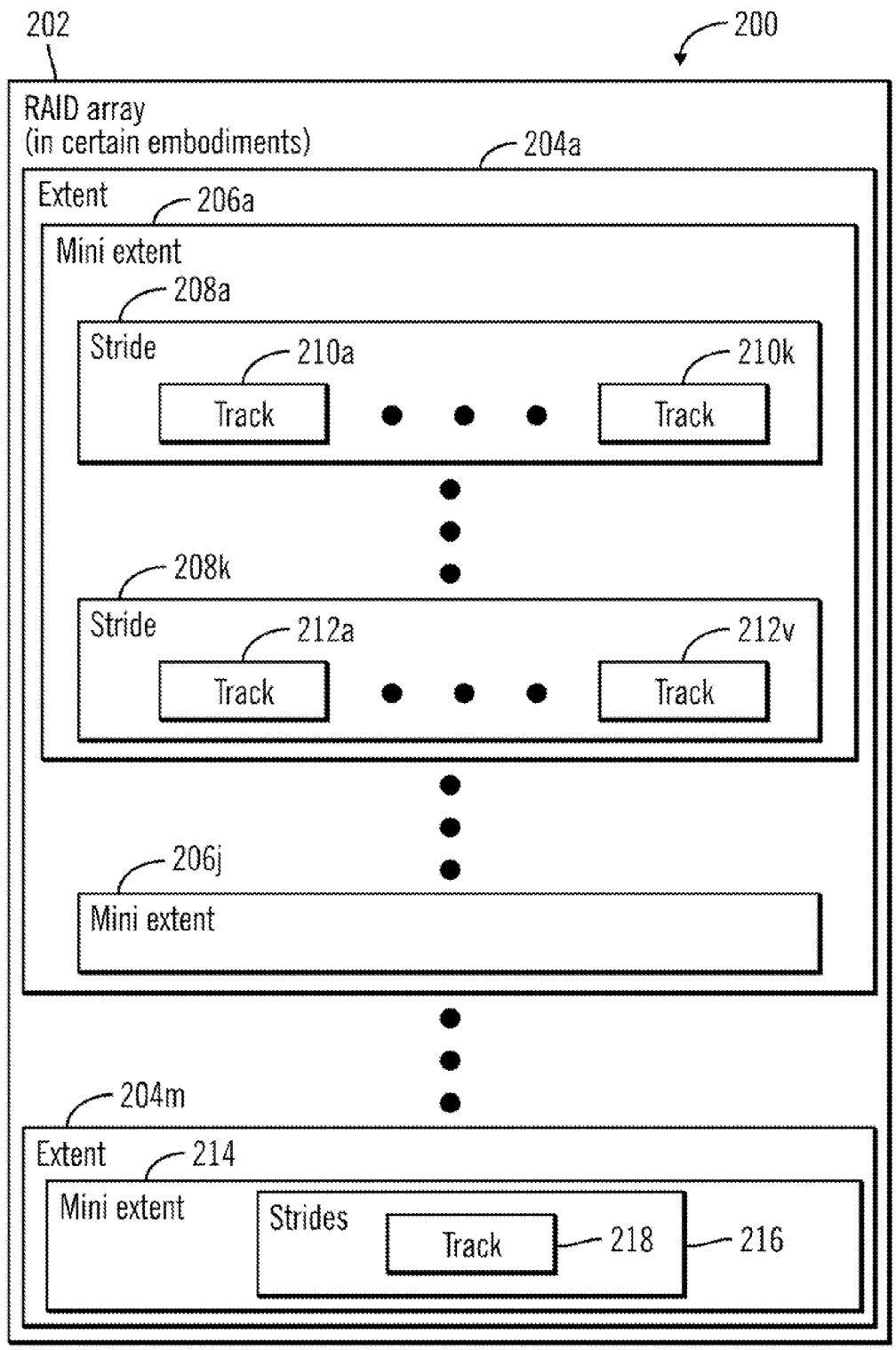
FIG. 2 illustrates a block diagram that shows a RAID array, in accordance with certain embodiments.

FIG. 2 illustrates a block diagram 200 that shows a RAID array 202, in accordance with certain embodiments. In certain embodiments, the RAID array 202 may store data in a plurality of extents 204a . . . 204m, wherein each extent may be comprised of a plurality of mini extents, wherein each of the plurality- of mini extents may be comprised of a plurality of strides, and wherein tracks may be stored in each of plurality of strides.

For example, extent 204a may be comprised of a plurality of mini extents 206a . . . 206j, and mini extent 206a may be comprised of a plurality of strides 208a . . . 208k. In an embodiment shown in FIG. 2, stride 208a stores tracks 210a . . . 210k, and stride 208k stores tracks 212a . . . 212v. Also, in certain embodiments shown in FIG. 2, extent 204m is comprised of mini extents 214, wherein mini extents 214 are comprised of strides 216, and wherein strides 216 store tracks 218.

Extents, mini extents, and strides are all units of storage and may be of various sizes. In certain embodiments, each extent of 1 GB may be divided into eight 128 MB mini extents. If there are approximately 1K strides per extent then there may be approximately 128 strides per mini extent.

Figure 3:
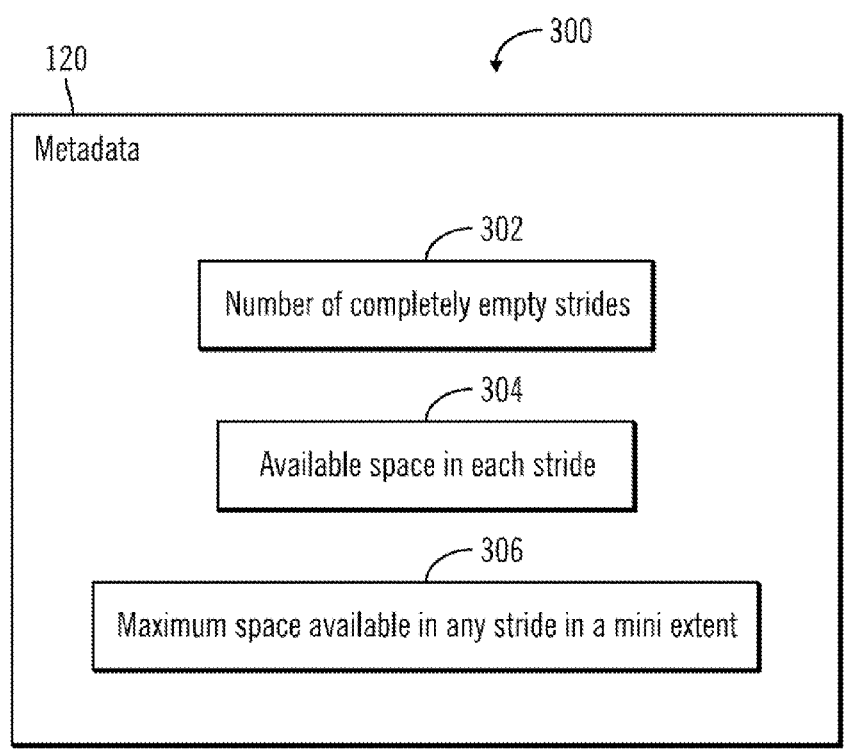
FIG. 3 illustrates a block diagram that shows metadata stored in the controller, in accordance with certain embodiments.

FIG. 3 illustrates a block diagram 300 that shows metadata 120 stored in the controller 102, in accordance with certain embodiments. The metadata 120 may store various elements 302, 304, 306 that indicate the number of completely empty strides (reference numeral 302), the available space in each stride (reference numeral 304), the maximum space available in any stride in a mini extent (reference numeral 306), etc.

In certain embodiments, the metadata 120 may be maintained per mini extent or stride or some other unit of storage. The metadata 120 provides a way to reduce search time for free space in a mini extent or a stride. The metadata 120 may not always be reliable. Instead certain embodiments may update metadata, such that the metadata 120 is more or less reliable when there is a need for using the metadata. The updates to the metadata 120 are not saved in non volatile storage for recovery from a failure. Following a recovery, some of the metadata 120 may be marked as unreliable. Each metadata has two states, reliable or unreliable. If the metadata state is unreliable, then new metadata is computed and stored, and the state of the metadata is marked as reliable. The metadata 120 may be used or updated at least during addition or deletion of tracks, and while destaging tracks from the cache 110.

Figure 4:
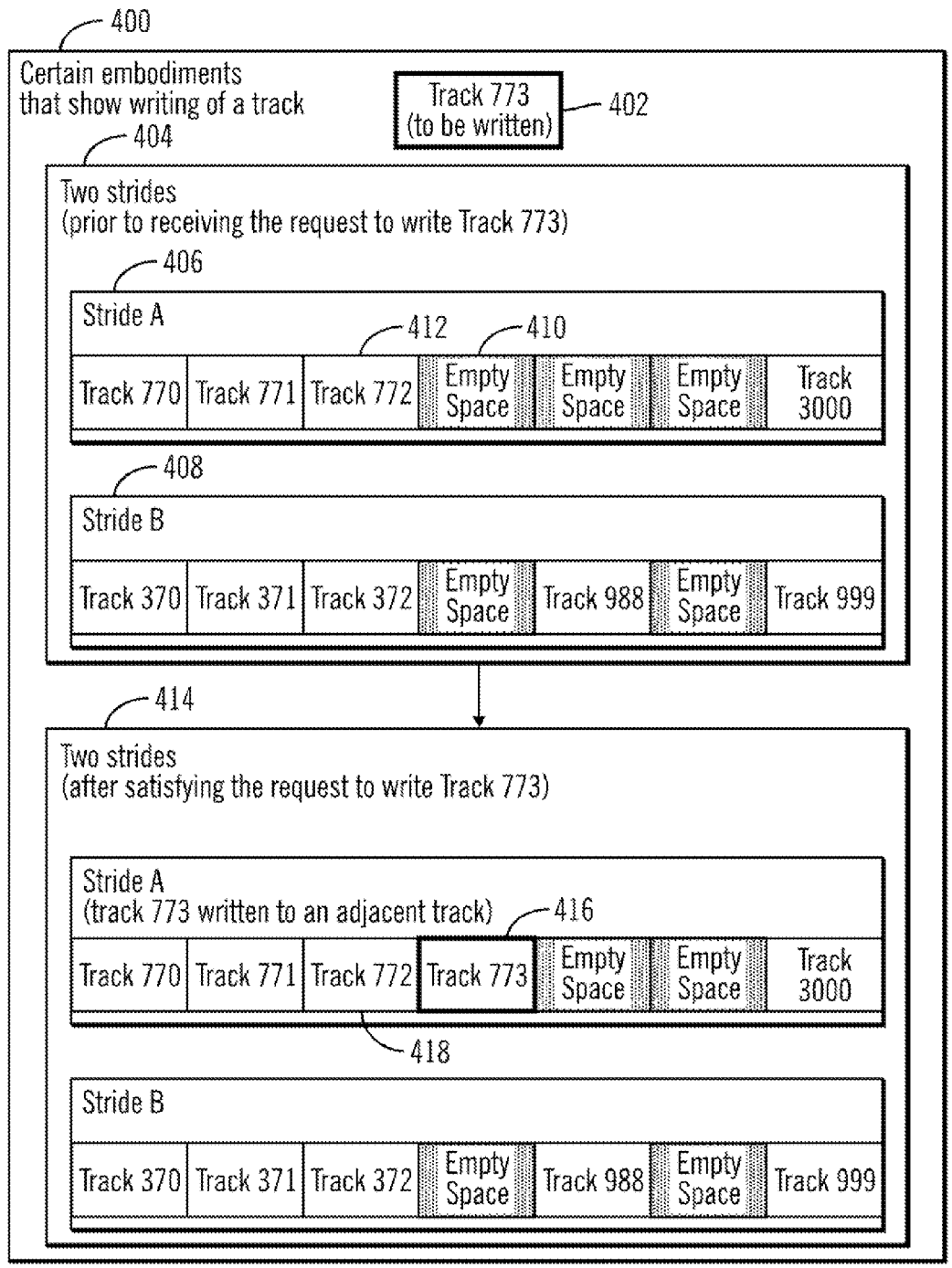
FIG. 4 illustrates a block diagram that shows the writing of a track on a stride selected from a plurality of strides, in accordance with certain embodiments.

FIG. 4 illustrates certain embodiments 400 that show the writing of a track on a stride selected from a plurality of strides. Track 773 (shown via reference numeral 402) is to be written, and the state of two strides 404 (i.e., stride A 406 and stride B 408) prior to receiving a request to write the track 773 (reference numeral 402) is shown in FIG. 4.

The management application 118 may determine that it is best to place track 773 (reference numeral 402) in the empty space 410 that is adjacent to already existing track 772 (reference numeral 412) in stride A 406. It is preferable to store consecutively numbered tracks adjacent to each other in the same stride for improving access speed on the RAID array 104, as read/write heads may have to move relatively less when consecutive tracks are accessed. Furthermore, since a stride is the unit of staging to the cache and destaging from the cache, it is preferable to store consecutive tracks on the same stride.

In FIG. 4, the state of two strides 414 (i.e., stride A and stride B) after satisfying the request to write the track 773 (reference numeral 402) is shown. The placement of track 773 (shown via reference numeral 416) is shown adjacent to existing track 772 (shown via reference numeral 418).

Therefore, FIG. 4 illustrates certain embodiments in which an attempt is made to place consecutively numbered tracks adjacent to each other in the same stride.

Figure 5:
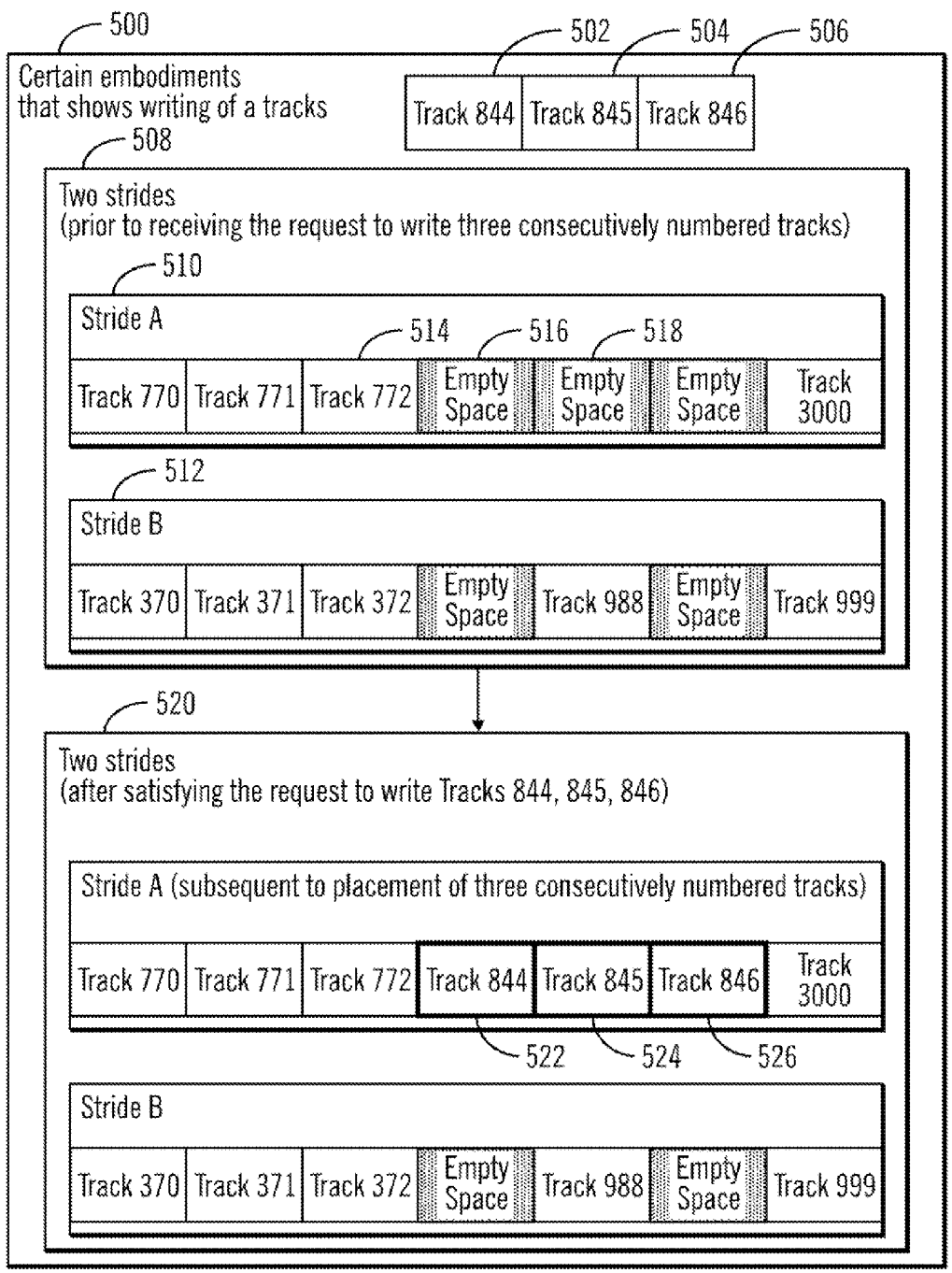
FIG. 5 illustrates a block diagram that shows the writing of a plurality of tracks on a stride selected from a plurality of strides, in accordance with certain embodiments.

FIG. 5 illustrates certain embodiments 500 that show the writing of a plurality of tracks on astride selected from a plurality of strides, in accordance with certain embodiments.

Three tracks numbered 844, 845, 846 (shown via reference numerals 502, 504, 506) are to be written, and the state of two strides 508 (i.e., stride A 510 and stride B 512) prior to receiving the request to write the three tracks (reference numerals 502, 504, 506) is shown in FIG. 5.

The management application 118 may determine that out of stride A 510 and stride B 512, only stride A has enough consecutive empty space (shown via reference numerals 514, 516, 518) to accommodate the three tracks (reference numeral 502, 504, 506) that are to be written. It is preferable to store the group of three consecutively numbered tracks 844, 845, 846 (reference numerals 502, 504, 506) adjacent to each other in the same stride for improving access speed on the RAID array, as read/write heads have to move relatively less when consecutive tracks are accessed. Furthermore, since a stride is the unit of staging to the cache and destaging from the cache, it is preferable to store the group of three consecutive tracks on the same stride.

In FIG. 5, the state of two strides 520 (i.e., stride A and stride B) after satisfying the request to write the three tracks 844, 845, 846 (shown via reference numerals 502, 504, 506) is shown. The placement of tracks 844, 845, 846 (shown via reference numerals 522, 524, 526) is shown within the same stride, i.e., in stride A.

Therefore, FIG. 5 illustrates certain embodiments in which an attempt is made to place a group of consecutively numbered tracks adjacent to each other in the same stride.

Figure 6:
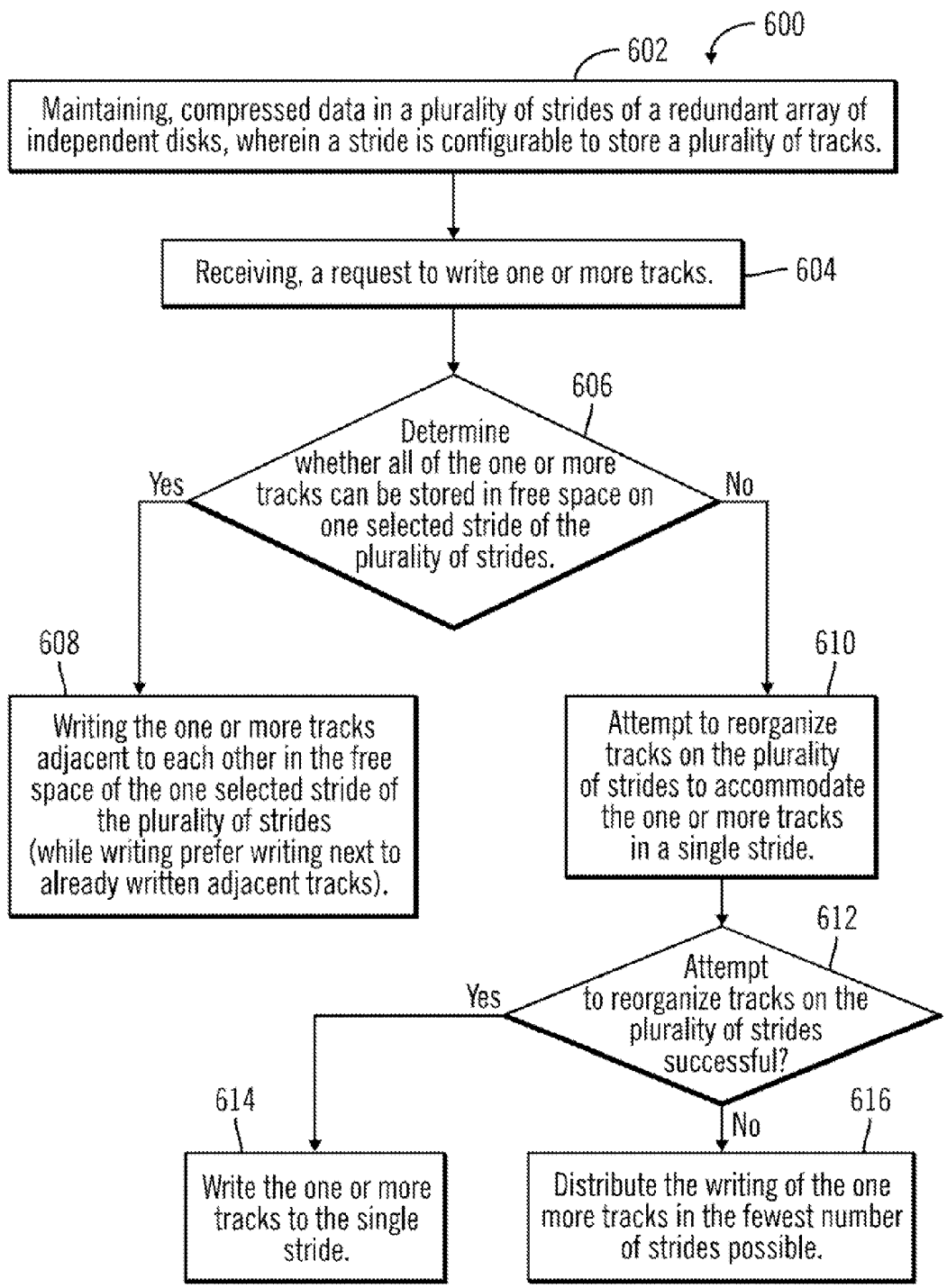
FIG. 6 illustrates a flowchart that shows certain operations, in accordance wife certain embodiments.

FIG. 6 illustrates a flowchart 600 that shows certain operations, in accordance with certain embodiments. In certain embodiments, the operations shown in flowchart 600 may be performed by the management application 118 that may be implemented in software, firmware, hardware or any combination thereof within the controller 102.

Control starts at block 602 in which the management application 118 maintains compressed data in a plurality of strides 112a . . . 112n of a redundant array of independent disks 104, wherein a stride is configurable to store a plurality of tracks 114a . . . 114r, 116a . . . 116s. A request is received (at block 604) to write one or more tracks and a determination (at block 606) is made as to whether all of the one or more tracks can be stored in free space on one selected stride of the plurality of strides 112a . . . 112n.

If at block 606 it is determined that all of the one or more tracks can be stored in free space on one selected stride of the plurality of strides 112a . . . 112n, then the one or more tracks are written (at block 608) adjacent to each other in the free space of the one selected stride of the plurality of strides. Furthermore, while writing it is preferable to write tracks next to already written adjacent tracks.

If at block 606 it is determined that all of the one or more tracks cannot be stored in free space on one selected stride of the plurality of strides 112a . . . 112n, an attempt is made (at block 610) to reorganize tracks on the plurality of strides 112a . . . 112n to accommodate all of the one or more tracks in a single stride. The attempt at reorganization may perform garbage collection and defragmentation of the RAID array 104 in an attempt to create space within the strides 112a . . . 112n.

Control proceeds to block 612 in which a determination is made as to whether the attempt to reorganize tracks on the plurality of strides is successful. If the attempt is successful then enough space has been created to accommodate ail of the one or more tracks in a single stride and the one or more tracks are written (at block 614) to the single stride. If the attempt to reorganize tracks on the plurality of strides is unsuccessful, then no single stride can accommodate all of the one or more tracks even after garbage collection and defragmentation, and the writing of the one more tracks is distributed (at block 616) in the fewest number of strides possible (e.g., the one or more tracks may be written in two strides).

Therefore, FIGS. 1-6 illustrates certain embodiments in which tracks that are numbered consecutively are placed adjacent to each other in a single stride in a compressed RAID array.

In certain alternative embodiments, the plurality of strides are distributed among a plurality of mini extents, wherein the plurality of mini extents are distributed among a plurality of extents. The one or more tracks are preferred to be stored in the same mini extent even if the one or more tracks cannot be stored in the same stride.

Additional Embodiment Details

The described operations may be implemented as a method, apparatus or computer program product using standard programming and/or engineering techniques to produce, software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal wife computer readable program code embodied therein, for example, in baseband or as part of a carrier wave. Such a propagated signal may take any of a variety of forms, including, but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.
*IBM, FlashCopy are trademarks or registered trademarks of International Business Machines Corporation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
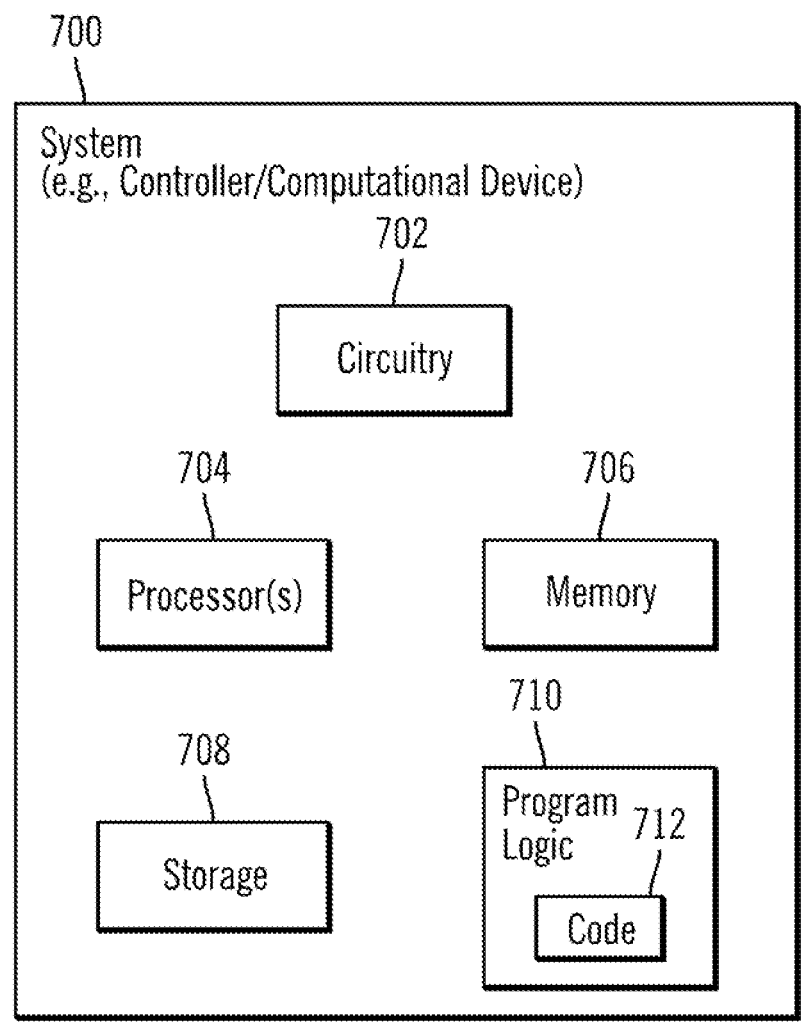
FIG. 7 illustrates a block diagram of a computational system that shows certain elements that may be included in the controller of FIG. 1, in accordance with certain embodiments.

FIG. 7 illustrates a block diagram that shows certain elements that may be included in the controller 102 or the host 106 in accordance with certain embodiments. The system 700 may comprise the controller 102 or the host 106 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in fee circuitry 702. Therefore, while FIG. 7 shows fee program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not ail) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining, compressed data in a plurality of strides of a redundant array of independent disks, wherein a stride is configurable to store a plurality of tracks, and wherein the plurality of strides are distributed among a plurality of mini extents, and the plurality of mini extents are distributed among a plurality of extents;
receiving, a request to write one or more tracks;
determining, whether all of the one or more tracks can be stored in one selected stride of the plurality of strides;
writing the one or more tracks in the one selected stride of the plurality of strides, in response to determining that all of the one or more tracks can be stored in the one selected stride;
performing a reorganization of the plurality of strides in an attempt to accommodate the one or more tracks in a single stride, in response to determining that all of the one or more tracks cannot be stored in the one selected stride; and
distributing the one or more tracks to more than one stride, in response to the reorganization of the plurality of strides not being able to generate the single stride to accommodate all of the one or more tracks, wherein the distributing of the one or more tracks is performed among a fewest number of strides within which the distributing of the one or more tracks is possible, and wherein the one or more tracks are all stored in a single mini extent even though the one or more tracks cannot be stored in the single stride.

2. The method of claim 1, wherein the one or more tracks are written next to a sequentially adjacent track in the one selected stride, wherein any two sequentially adjacent tracks are indexed consecutively, wherein the two sequentially adjacent tracks are indexed consecutively if the two sequentially adjacent tracks are identified by consecutive integers.

3. The method of claim 2, wherein
metadata associated with the extents, mini extents, and strides store information on the number of completely empty strides, an amount of available space in each stride, and the maximum space available in any stride in any mini extent.

4. The method of claim 3, wherein the redundant array of independent disks are configured to conform to a RAID-5 level in which data and parity striping is performed across all drives.

5. The method of claim 4, wherein the stride is a unit of storage in the redundant array of independent disks, and wherein blocks of a file that are spread out across a plurality of disk drives via data striping are written in one or more of the plurality of strides of the redundant array of independent disks.

6. The method of claim 1, further comprising:
deploying computing infrastructure, comprising integrating computer-readable code into a computational system, wherein the computer-readable code in combination with the computational system performs:
the maintaining of the compressed data in the plurality of strides of the redundant array of independent disks;
the receiving of the request to write the one or more tracks;
the determining of whether all of the one or more tracks can be stored in one selected stride of the plurality of strides; and
the writing of the one or more tracks in the one selected stride of the plurality of strides.

7. The method of claim 6, wherein the integrating of the computer-readable code into the computational system is performed by downloading the computer-readable code to the computational system in a networked computing environment.

8. The method of claim 1, wherein:
a first stride stores a track with a first track number with at least three consecutive empty spaces for tracks adjacent to the first track number;
a second stride does not have at least three consecutive empty spaces for tracks ;
a write request is received to write three consecutively numbered tracks; and
in response to determining that the first stride has at least three consecutive empty spaces for tracks and the second stride does not have at least three consecutive empty spaces for tracks, writing the three consecutively numbered tracks to the first stride adjacent to the track with the first track number.

9. The method of claim 1, wherein:
a first stride stores a first track with a first track number;
a second stride stores a second track with a second track number;
a write request is received to write a third track with a third track number; and
in response to determining that the third track number is consecutive to the first track number but is not consecutive to the second track number, writing the third track adjacent to the first track in the first stride.

* * * * *